Sept. 10, 1935.　　　W. T. ANDERSON　　　2,013,944
COIN CONTROLLED MECHANISM
Filed Nov. 21, 1933　　　7 Sheets-Sheet 1
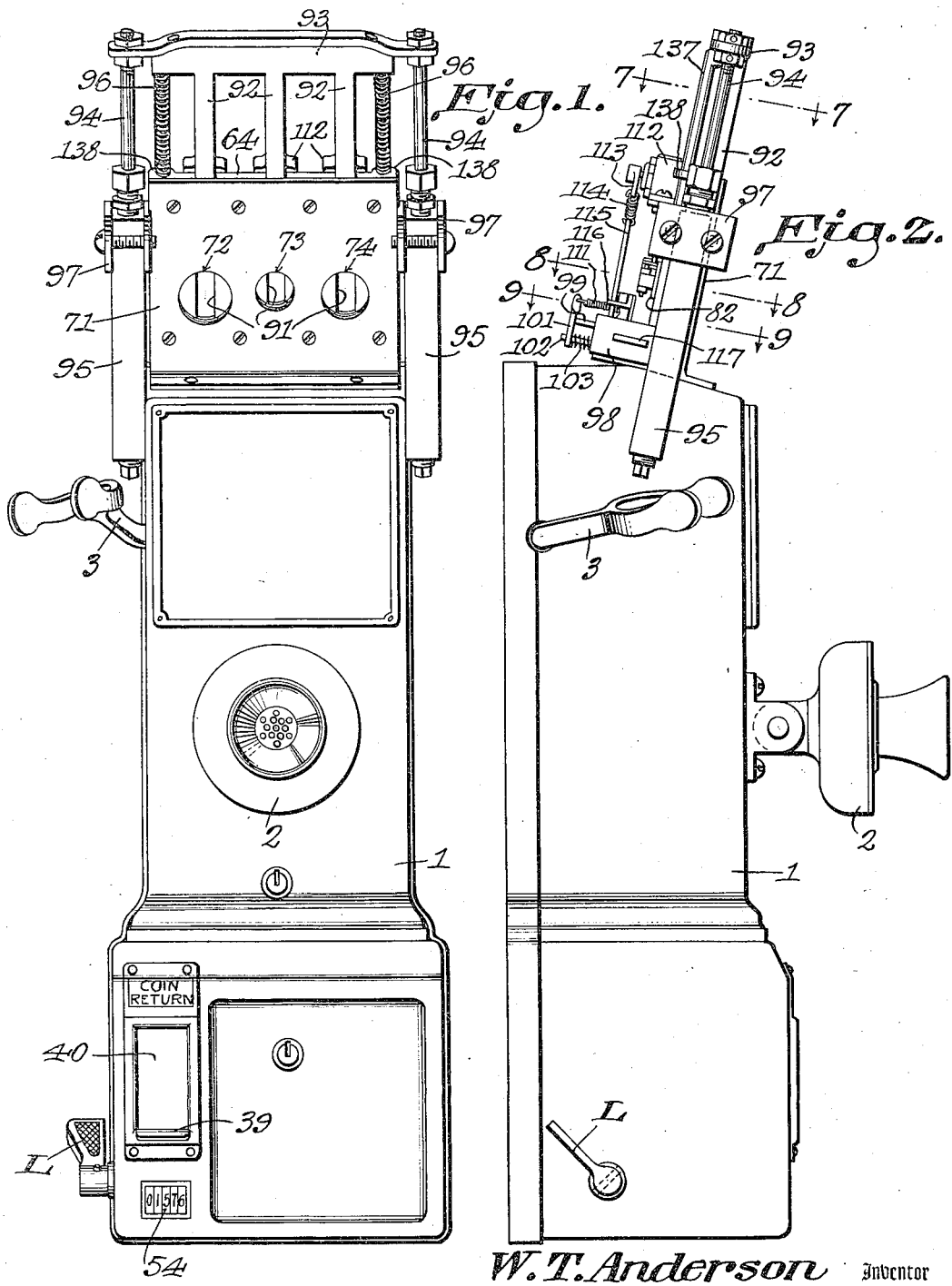
W. T. Anderson Inventor

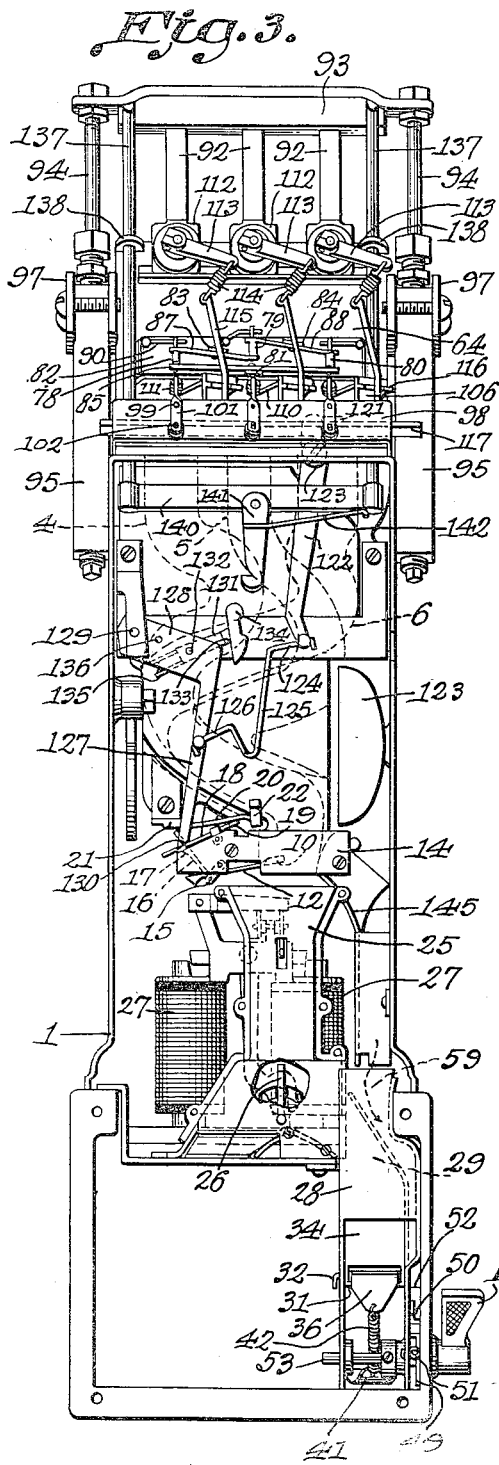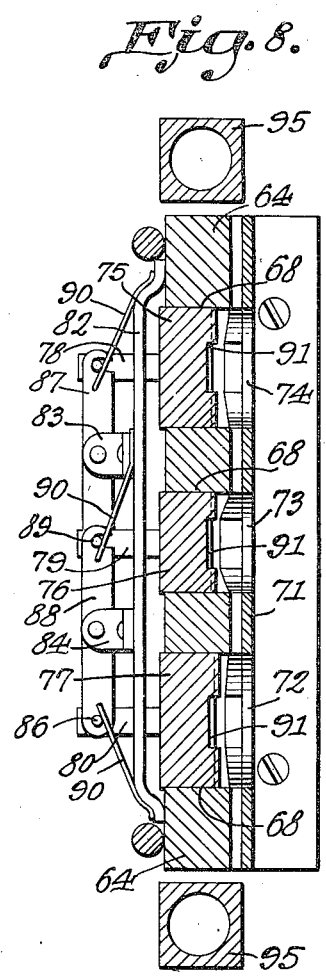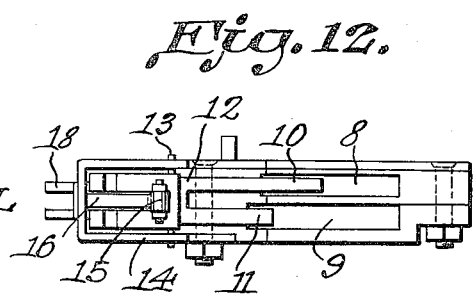

Sept. 10, 1935.  W. T. ANDERSON  2,013,944
COIN CONTROLLED MECHANISM
Filed Nov. 21, 1933  7 Sheets-Sheet 3

W. T. Anderson Inventor

Attorneys.

Sept. 10, 1935.　　　W. T. ANDERSON　　　2,013,944
COIN CONTROLLED MECHANISM
Filed Nov. 21, 1933　　　7 Sheets-Sheet 4
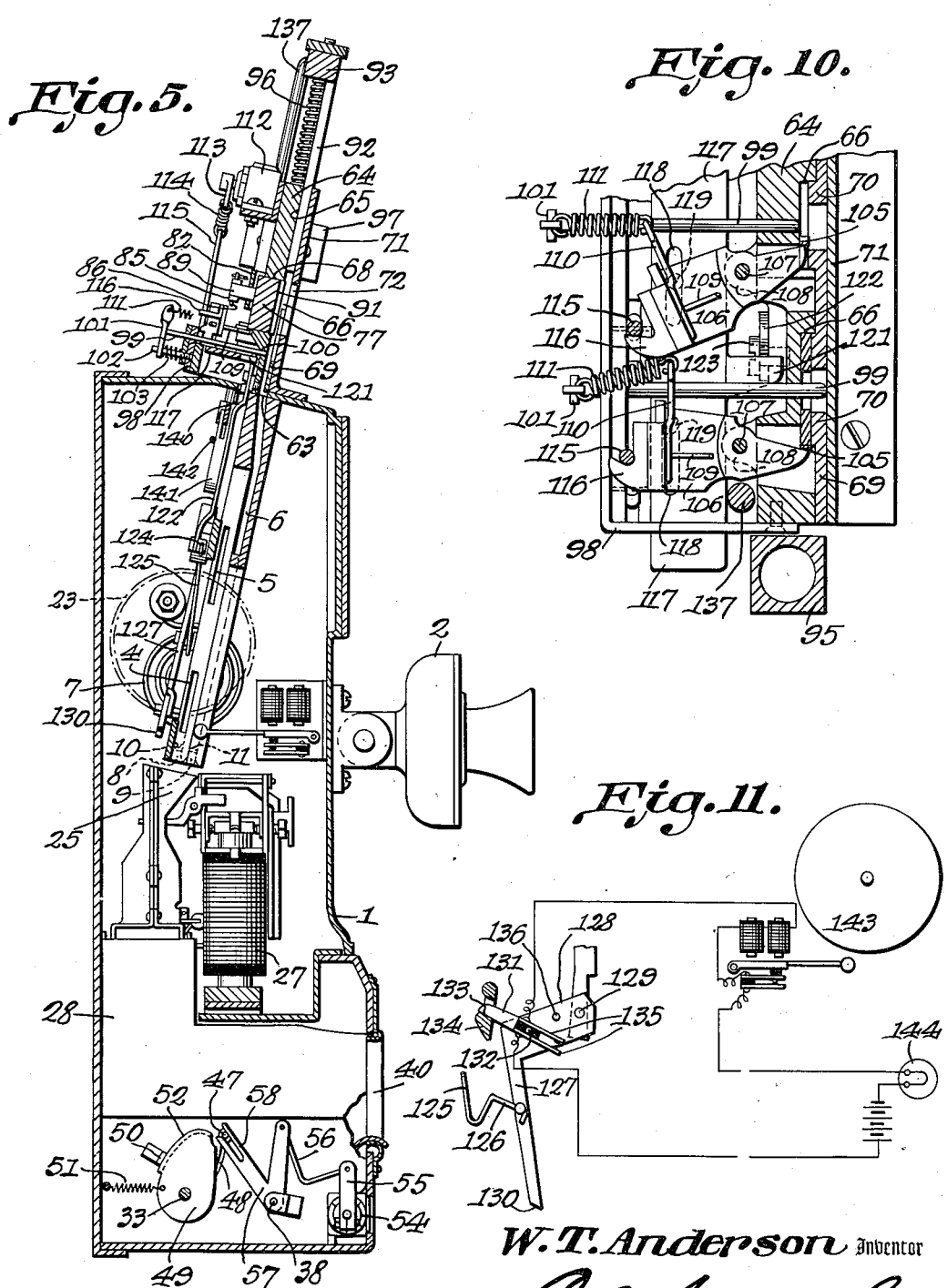

Sept. 10, 1935.  W. T. ANDERSON  2,013,944
COIN CONTROLLED MECHANISM
Filed Nov. 21, 1933  7 Sheets-Sheet 5
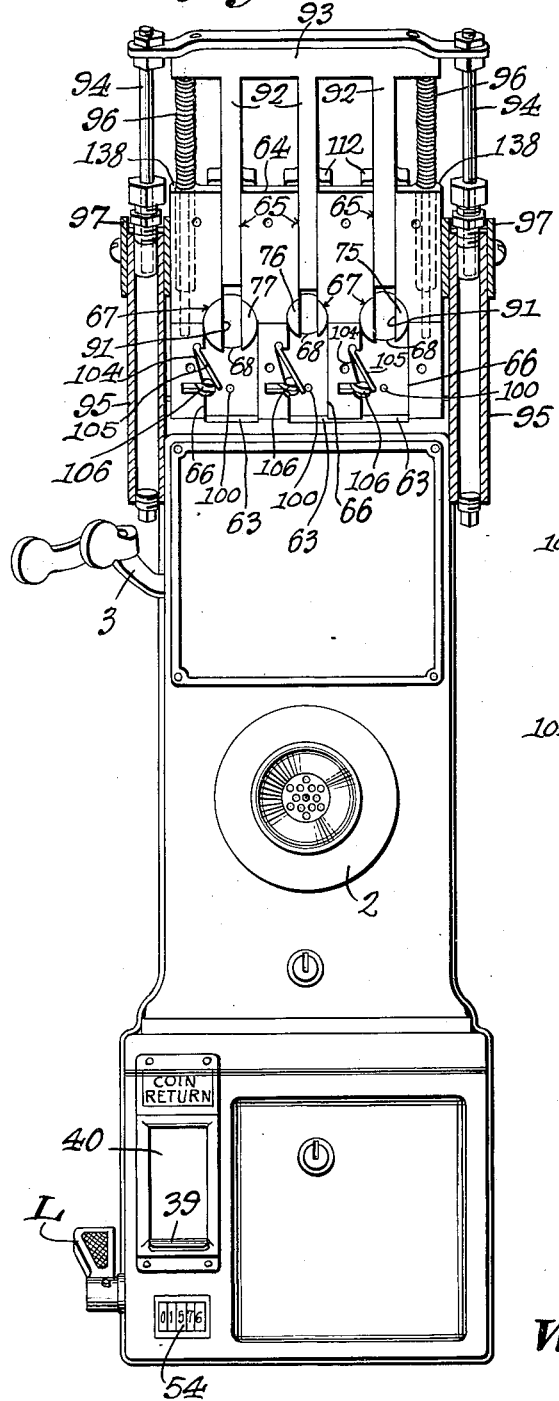
W.T. Anderson Inventor
By C.A. Snow & Co.
Attorneys.

W. T. Anderson Inventor

Sept. 10, 1935.  W. T. ANDERSON  2,013,944
COIN CONTROLLED MECHANISM
Filed Nov. 21, 1933   7 Sheets-Sheet 7
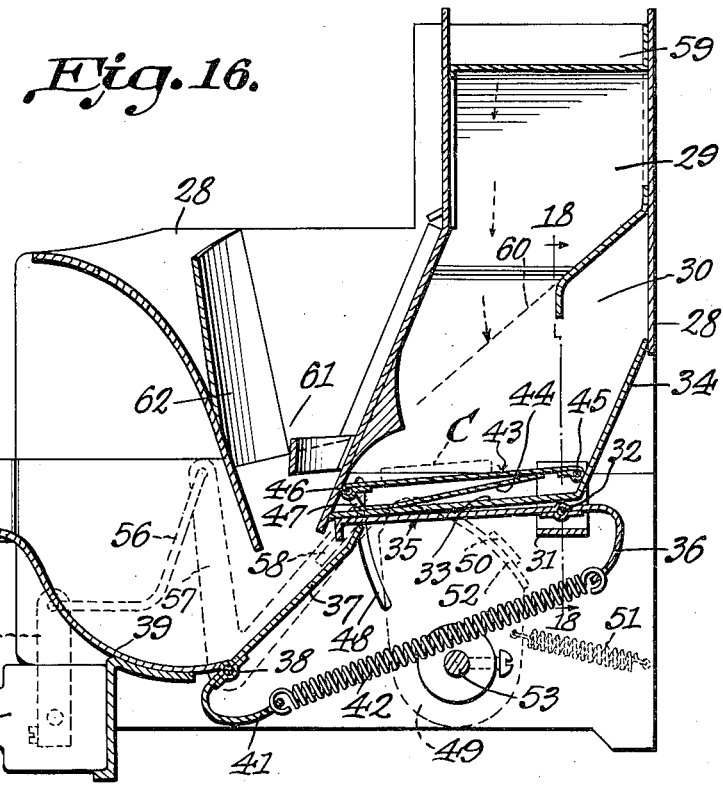
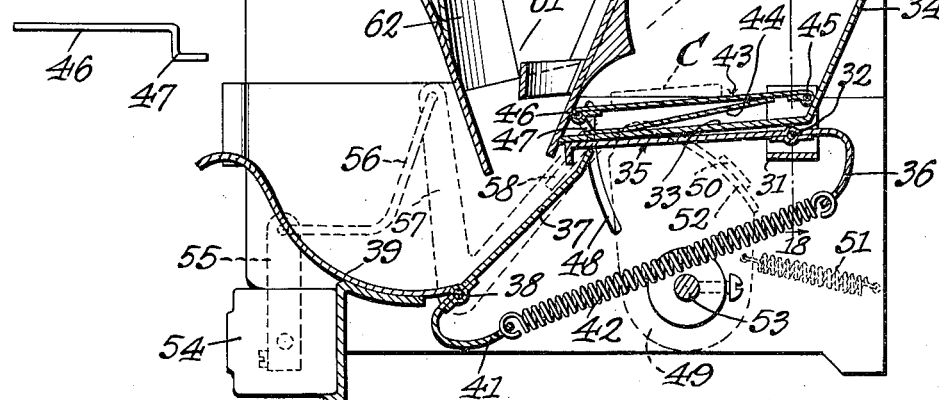
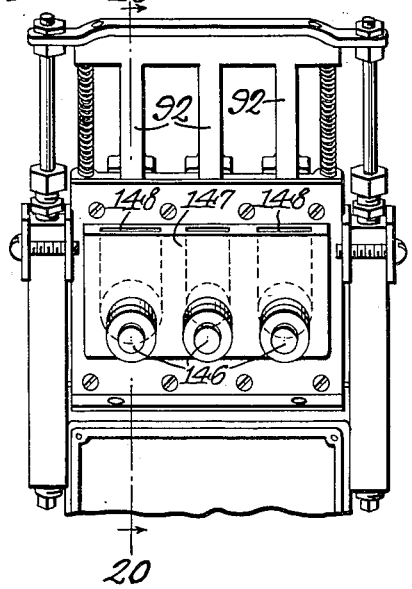
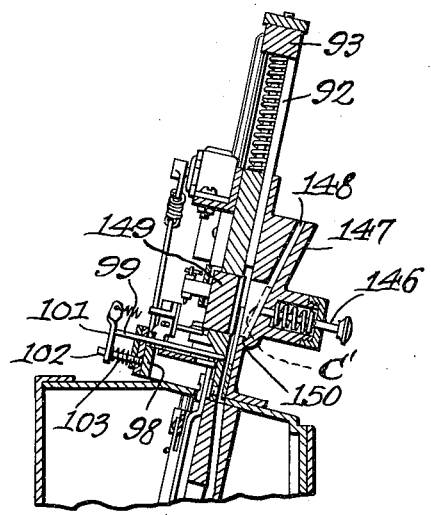
W. T. Anderson, Inventor Patented Sept. 10, 1935

2,013,944

UNITED STATES PATENT OFFICE 2,013,944

COIN CONTROLLED MECHANISM

William T. Anderson, Macon, Ga.

Application November 21, 1933, Serial No. 699,072

11 Claims. (Cl. 194—1)

This invention relates to coin controlled telephones and constitutes an improvement upon the structure disclosed in my co-pending application filed February 13, 1932, Serial No. 592,815.

The devices heretofore used have had certain objectionable features which the present invention serves to overcome. For example, where two or more coin chutes are provided it sometimes happens that more than one coin are deposited simultaneously, thereby causing a confusion of signals which prevents the operator from determining the exact amount placed in the box. An object of the present invention is to provide a means whereby coins can be placed in the chute only one at a time.

When telephone apparatus is "out of service" it frequently happens that coins are deposited by customers unaware of the condition. This causes annoyance both to the company and to the customer. An object of the improvements herewith presented is to prevent insertion of a coin while the apparatus is inoperative.

A further object of the invention is to provide the telephone with a signal apparatus which will be operated in the usual manner following the insertion of a proper coin, the movement of the coin within the apparatus serving automatically to discontinue the operation of the signal if the coin is of the proper value. In the event that a slug or check of improper value is inserted into the machine and the signal actuated thereby, the operation of the signal will continue until the condition has been remedied by an authorized person.

A still further object is to provide coin feeding and counting mechanism and also a coin trapping and counting mechanism for refunds which can be installed in present-day telephone apparatus without changing the construction of the usual mechanism within the box or casing.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred forms of the invention have been shown.

In said drawings:

Figure 1 is a front elevation of a wall telephone equipped with the present improvements.

Figure 2 is a side elevation thereof.

Figure 3 is a rear elevation with the back plate removed.

Figure 5 is a vertical section through the apparatus from front to rear, the parts being shown in the relative positions illustrated in Figure 3.

Figure 6 is a front elevation of the telephone with the front cover plates of the coin feeding mechanism removed to show the upper portions of the coin channels and adjacent parts.

Figure 7 is a section on line 7—7, Figure 2.

Figure 8 is an enlarged section on line 8—8, Figure 2.

Figure 10 is a view similar to Figure 9 showing a portion only of the mechanism, some of the parts illustrated in the positions occupied thereby when a washer is forced into the machine.

Figure 11 is a view illustrating in diagram the signal switch and the circuit controlled thereby.

Figure 12 is an enlarged plan view of the coin operated trip lever.

Figure 16 is an enlarged vertical section taken from front to rear illustrating the retaining and releasing mechanism for a coin to be refunded.

Figure 17 is an elevation of the crank member forming a part of said mechanism.

Figure 19 is a front elevation of the upper portion of the telephone showing a slightly modified form of coin feeding mechanism.

Figure 20 is a section on line 20—20, Figure 19.

Figure 4:
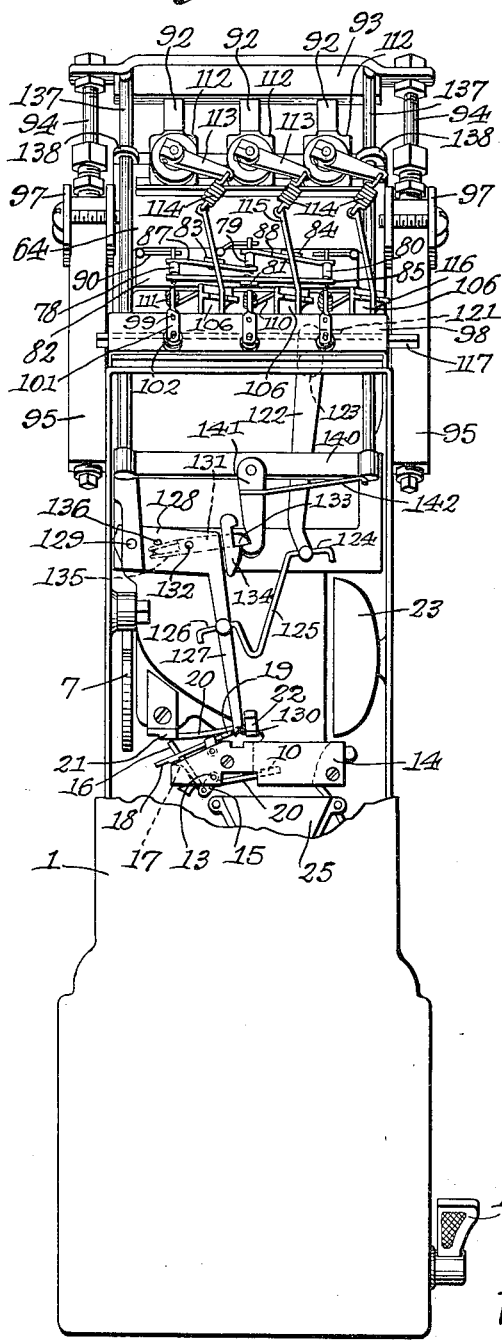
Figure 4 is a similar view showing the relative positions of the parts following the depression of the coin feeding plungers, the lower part of the back plate being shown in elevation.

Referring to the figures by characters of reference 1 designates a telephone of the usual coin box type provided with a transmitter 2 and a receiver hook 3. Within this box are located tortuous coin delivering chutes, 4, 5, and 6 for receiving coins or checks of different sizes such for example, as nickels, dimes and quarters respectively. The chute 6 adapted to receive the larger checks or quarters is so located that when the coin is directed therealong it will strike against a gong 7 and thus insure transmission of a proper signal to the central office. Chutes 4 and 5 which are intended for delivering nickels and dimes, are adapted to conduct the coins or checks to an outlet opening 8. Another outlet opening 9 is located for the reception of quarters delivered from the channel 6. Across these openings 8 and 9 are extended fingers 10 and 11 of a tripping lever 12 which is fulcrumed at 13 in a bracket 14 provided therefor. This lever has a short arm 15 which carries a lifting dog 16 provided with a tooth 17. This tooth is supported under and is adapted, when elevated, to thrust upwardly against one end portion of a latch lever 18 the other end of which is formed with a laterally extending stop head 19. This head normally presses upwardly against a guide or stop 20 connecting spaced stop lugs 21 and 22.

The chute 4 for receiving nickels extends close to a bell 23 so that during the travel of a nickel within this chute to the outlet 8 it will come against the bell and sound it once. The chute 5 provided for the dime is so located that as the coin travels therethrough toward its outlet 8 it will twice strike the bell. Thus through the use of the gong 7 and the bell 23 the operator at the central office can detect readily the value of the coin which has been deposited. These chutes, 4, 5, and 6, the gong 7 and the bell 23 are old in the telephone art and are merely shown and described because of their relationship to the remainder of the mechanism.

Beneath the outlets 8 and 9 there is located the usual coin receiving hopper 25 in which is located a tiltable valve or gate 26 adapted to be actuated by remote controlled magnets 27. When one of these magnets is energized the gate will act to direct into the coin receiving lower portion of box 1 the coin to be retained. When the gate is shifted in the opposite direction through the energizing of the other magnet the deposited coin will be guided in another direction so as to be returned to the customer. This mechanism is also old in the art and no claim is made therefor.

Located beneath the hopper 25 so as to receive coins therefrom, is a box 28. In this box is provided a channel 29 adapted to receive the coins refunded from the hopper through its regular outlet and the bottom of this channel opens into a coin trapping compartment 30. The bottom of this compartment includes a yoke 31 which is fulcrumed within the box as shown at 32 and has an integral angular plate 33 which normally extends across the bottom of the compartment 30 and upwardly as at 34 to a point where it can thrust backwardly against a wall of the box. This bottom plate is yieldingly held by a supporting plate 35 which is fulcrumed in yoke 31 and has a downturned portion 36. Supporting plate 35 extends over a shutter 37 which is fulcrumed at its lower end as indicated at 38 and forms the back wall of a trough 39 which opens through the front of box 1 as shown at 40 and is accessible to the customer.

A downwardly extending portion 41 projects from the lower end of shutter 37 and is connected by a spring 42 to the extended portion 36. Thus this spring acts to hold plate 35 in elevated position against the pivotally mounted bottom plate 33 and also acts to hold shutter 37 normally closed against plate 35.

A coin actuated plate 43 is hingedly mounted within the compartment 30 near the bottom thereof and is yieldingly supported by a light spring 44. This spring is of such tension as to yield when a coin of proper value is deposited on plate 43, thereby permitting the plate to swing downwardly about its fulcrum 45.

Rotatably connected to that edge of plate 43 remote from fulcrum 45 is a rotatable rod 46 one end of which has a depending crank arm 47 adapted to slide within an arcuate slot 48 in the side of box 28.

Mounted for rotation on one side of the box is a cam 49 held normally against a stop 50 by a spring 51. This cam is provided with an arcuate laterally extending flange 52 so located that, when plate 43 and crank 47 are in their normal positions, the cam can be swung about its axis of rotation without acting on any of the parts of the apparatus. However should a coin depress plate 43 so as to lower crank 47, rotation of the cam in a counter-clockwise direction in Figure 13 would result in moving the flange 52 over crank arm 47 with the result that said crank arm will be pulled downwardly within slot 48. Thus plates 43, 33 and 35 will be pulled downwardly about fulcrum 32 and shutter 37 will be pressed backwardly and downwardly. Consequently the coin will be free to gravitate from plate 43 onto shutter 37 and into trough 39.

As the cam approaches the limit of its counter-clockwise movement in Figure 16 the flange 52 will pass off of crank arm 47 and as spring 42 is under tension it will act instantly to snap the released plates 33, 35 and 43 and the shutter 37 back to their normal positions. When the cam is released spring 51 will return it to its normal position.

The cam can be actuated by means of a small lever L located at one side of the box 1 and attached to a shaft 53 to which the cam is secured.

It will be obvious from the foregoing disclosure that the mechanism shown in Figure 16 cannot be operated unless a coin of more than a predetermined weight is deposited on plate 43. Cam 49 can of course be actuated at will but the coin will not be released unless it is of more than a predetermined weight as before explained.

For the purpose of indicating the number of coins returned a counter of any desired construction is mounted in the telephone casing as indicated at 54. The arm 55 of this counter is connected by a link 56 to a bell crank 57 one arm of which is forked as indicated at 58 so as to be engaged and actuated by crank arm 47. Thus every time the shutter 37 is lowered the counter will be actuated.

In the coin mechanism of telephones such as commonly used provision is made for the lateral discharge of an undersized coin from every coin chute. In the present instance any laterally discharged coin will not fall into the channel 29 but will be delivered into another channel 59 at the side thereof and will gravitate within said channel in the direction indicated by the dotted arrow in Figure 16 until it reaches the inclined bottom 60 of channel 59 whereupon it will be deflected to an outlet 61 opening into a hopper 62. This hopper discharges downwardly onto the shuter 37 and into trough 39. Consequently an undersized coin deposited in the wrong channel and getting by any of the mechanism will be returned to the customer.

The mechanism thus described has reference to the disposal of a coin after it has been fed into the telephone casing. The means employed for feeding the coins is located at the top of the telephone casing and will now be described in detail.

Formed in the top of the casing are coin receiving openings 63 which communicate with the upper ends of the respective chutes 4, 5, and 6. A plate 64 is extended upwardly from the casing and is preferably inclined upwardly and forwardly, it being provided in its forward face with parallel guide grooves 65 which open downwardly into coin receiving grooves 66. These grooves are of different widths, depending upon the diameters of the coins to be placed therein and they communicate at their lower ends with the respective openings or slots 63. The upper portion of each coin receiving groove 66 is preferably substantially semi-circular as shown at 67 and forms part of the wall of an opening 68 extending through the plate. Thus one of these openings is provided for each coin receiving groove.

Extending across the grooves 66 is a guide plate 69 having thickened portions 70 adapted to extend into the respective grooves 66 so as to constitute gauging means whereby coins which are too thick cannot be forced downwardly within the grooves. This arrangement will be obvious by referring for example to Figures 9 and 10.

In front of the guide plate 69 there is provided a front cover plate 71 in which are formed coin receiving openings 72, 73, and 74 respectively arranged in front of the upper portions of the respective coin receiving grooves 66. One of these openings 72 is of such size as to receive, for example, a quarter. Another opening, 73, can be of such size as to receive a dime but nothing larger. The third opening, 74, is of such size as to receive a nickel but no larger coin.

The openings 72, 73, and 74 are located directly in front of and are preferably coaxial with the respective openings 68 and in these openings 68 are slidably mounted baffles or plugs 75, 76, and 77 respectively. Plug 75 has a stem 78 extending backwardly therefrom and a stem 79 is extended backwardly from plug 76 while another stem 80 is extended backwardly from plug 77. A bracket 81 is located adjacent to but is spaced from plug 76 and is mounted on a guide strip 82 fixedly connected to the back of plate 64. Other brackets 83 and 84 are located between the stems of the plugs. A coupling lever 85 is fulcrumed at its center upon the bracket 81 and is pivotally connected at one end to stem 78 while its other end is adapted to exert a thrust against a pin 86 extending from the stem 80. Another lever 87 is fulcrumed on bracket 83 and is pivotally connected at one end to the stem 79 and is pivotally and slidably mounted at its other end on the stem 78. A third lever 88 is fulcrumed on bracket 84 and has one end pivotally connected to stem 80 while its other end is adapted to thrust against a pin 89 carried by stem 79. Springs 90 exert a backward thrust upon the respective stems so that the plugs 75, 76, and 77 are normally retracted into their openings 68.

By providing the lever connections which have been described a coin, when forced backwardly into any one of the openings in plate 71 and into the coin receiving groove back of the opening, will come against the plug 75, 76, or 77 in the path thereof and force it backwardly. For example when plug 75 is pushed backwardly its stem 78 will actuate both levers 85 and 87 so that they will thrust the respective plugs 77 and 76 forwardly into the openings in front thereof so that no coins can then be inserted into the other openings. Should a coin be inserted into opening 73 it would thrust against plug 76. This would cause lever 87 to advance plug 75 and would also exert a thrust against lever 88 to advance plug 77. Should a coin be inserted into the opening 72 the backward movement of plug 77 would result in transmission of thrust from pin 86 to lever 85 so as to advance plug 75. Lever 88 would at the same time thrust against pin 89 and advance plug 76.

Obviously, from the foregoing explanation, only one coin can be inserted into the apparatus for one operation and the choking of a telephone box such as results from the insertion of two coins in two openings at the beginning of the operation, is prevented.

Each of the plugs 75, 76, and 77 is formed in its front face with a diametrical groove 91 adapted to aline with the groove 65 adjacent thereto. Thus these grooves can receive fingers 92 extending downwardly from a cross head 93 and slidable within the grooves 65. Each end of the cross head has a stem 94 extending downwardly therefrom and working in dash-pot 95. Coiled springs 96 or the like are interposed between the cross head and the top of plate 64 and serve to hold the cross head normally elevated with the fingers 92 adjacent to but spaced from the grooved plugs 75, 76, and 77. By referring to Figure 7 it will be noted that the dash-pots 95 are held to the sides of plate 64 by clamping plates 97.

Secured to the plate 64 at the sides thereof is a fixed yoke 98 which extends across and is spaced from the back of the plate. This yoke supports plungers 99 which are slidable therein and within openings 100 formed in the back walls of the respective grooves 66. Each plunger has secured to its back end a head 101 one end of which is slidable on a guide pin 102 and is held pressed backwardly by a spring 103 on the pin. Thus all of the plungers 99 are held normally retracted from the respective grooves 66.

One side wall of each groove 66 has a recess 104 in which is fulcrumed a lever 105 which is normally inclined downwardly into the groove so as to be engaged and deflected laterally by a coin of proper diameter when forced downwardly within the groove. This lever bears laterally against the nose of a coupling lever 106 fulcrumed on a pivot pin 107 carried by an ear 108 extending backwardly from plate 64. One of these levers is provided for each groove 66 and each lever has a spring 109 connected thereto and coiled about its pivot pin for holding the nose of lever 106 pressed normally against inclined lever 105 as shown, for example, in Figures 6 and 9.

Each lever 106 is provided with a laterally extending finger 110 which is joined by a coiled spring 111 to the head 101 of one of the plungers 99.

Figure 9:
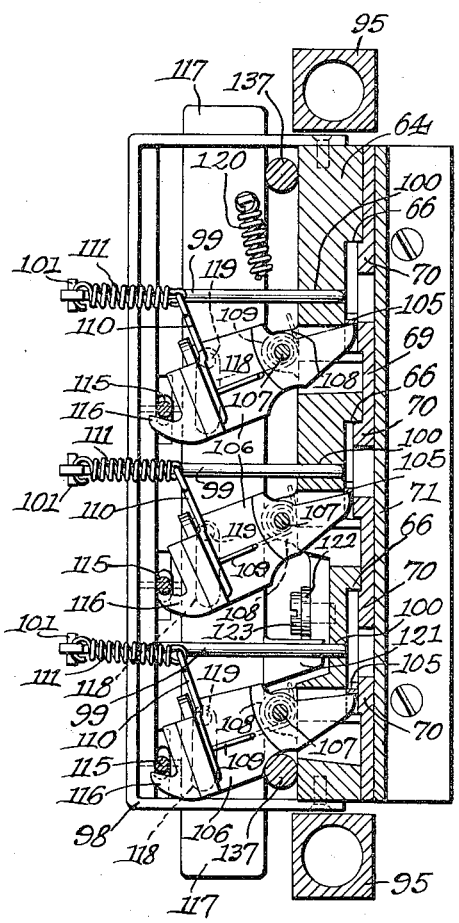
Figure 9 is an enlarged section on line 9—9, Figure 2.

Associated with each coin groove 66 is a counter 112. Thus where three coin grooves are provided there will be three counters 112. These counters can be located at any convenient points. In the present structure they are fixedly mounted on the back of plate 64 at the top thereof. Each counter has the usual operating arm 113 and each of these arms is connected by a coiled spring 114 to a link 115 which extends downwardly therefrom and is pivotally connected at its lower end to the yoke 98. A lug 116 is extended from the back end of each coupling lever 106 and each lug is normally close to one of the links 115 as shown in Figure 9. The lugs are so located that when this coupling lever is swung out of normal position as shown at the lower end of Figure 10, the link 115 will be swung laterally by the lug and about its bottom pivot so as to pull through its spring 114 upon the arm 113 connected thereto and thereby actuate the counter. Thus the number of operations of each lever 106 will be counted.

Mounted to slide in the sides of yoke 98 is a flat bar 117 having longitudinal slots 118 for receiving pins 119 extending downwardly from the respective coupling levers 106. This bar is held normally in one extreme position by a spring 120 one end of which is attached to the bar while the other end is attached to the back of plate 64. When the plate is thus located one end wall of each slot is positioned against the pin 119 in said slot. It will be obvious, however, that when any one of the levers 106 is swung about its pivot, the pin 119 depending from said lever will thrust against the bar 117 and move it against the action of spring 120. The slots will permit the bar, when thus actuated, to move without shifting the remaining levers.

Extending from one edge of the bar 117 is a tripping finger 121 which laps the upper short arm of a lever 122 fulcrumed at 123 upon the back of plate 64. The lower end of this lever 122 has a limited sliding engagement with one end portion 124 of a resilient angular link 125 the other end portion 126 of which has limited sliding engagement with an angular lever 127. The upper portion of this lever is normally substantially horizontal as shown at 128 and engages the fulcrum pin 129. The other arm of the lever extends downwardly and terminates in a beveled end 130.

A dog 131 is pivotally connected at 132 to the upper end portion 128 of lever 127 and has a projecting beveled portion 133 movably supported within a guide 134 fixedly mounted in the box or casing 1. The other end portion of this dog carries resilient contacts 135 which are insulated from each other and normally spaced apart. A pin 136 is carried by the upper portion of lever 128 and is normally spaced from these contacts.

The cross head 92 is provided with depending guide rods 137 movable within suitably located guides 138. The lower ends of these rods, which are arranged within the box or casing 1, are connected by a cross bar 140 and pivotally connected to this bar is a latch 141. A spring 142 serves to hold this latch normally pressed laterally so that, when the cross head and its bar 140 are lowered the latch will come against and be deflected by the guide 134 and projecting end 133 of dog 131.

The lower beveled end 130 of lever 127 is adapted to move along guide 20 between the stops 21 and 22 and is normally held against stop 21 by gravity as indicated in Figure 3. When the parts are thus positioned the pin 136 is spaced from contacts 135 so that an electric circuit, which has been indicated in Figure 11, is normally broken. This circuit includes an electric bell 143 located at the subscriber station and a signal light 144 or the like located at the central office.

Figure 13:
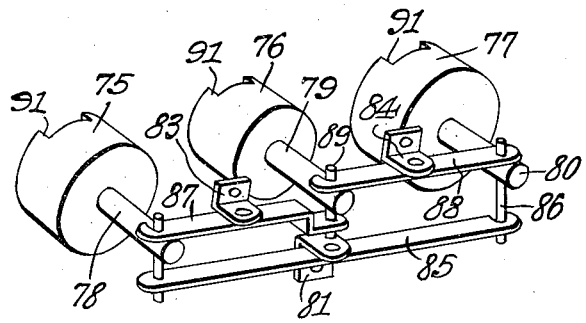
Figure 13 is a perspective view of the movable plugs and their lever connections.
Figure 14:
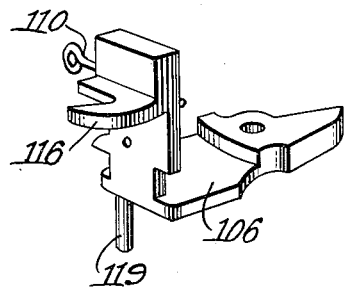
Figure 14 is a detail view of a coupling lever.
Figure 15:
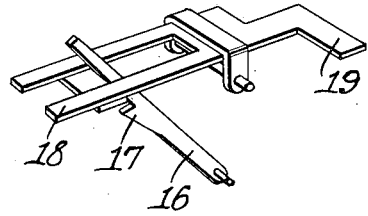
Figure 15 is a perspective view of the latch lever and its thrusting link forming part of the coin actuated release mechanism.
Figure 18:
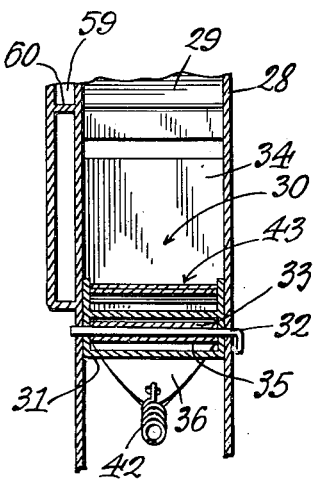
Figure 18 is a section on line 18—18, Figure 16.

Normally the parts are located as in Figures 1 and 3 and also as illustrated in Figure 13. Thus the cross head 93 can be thrust downwardly against springs 96 and released without producing any operation and the lever 52 can likewise be actuated without result.

When it is desired to place a call it is necessary to use a particular coin for the purpose of signalling the central office. It is intended generally to use a nickel for this purpose and one of the openings, 74, is provided to receive the nickel, it being of such size as to prevent the insertion of a larger coin. When the nickel is inserted in the opening it necessarily presses back against the plug 75, thereby locating the coin in the upper portion of its groove 66 between the adjacent finger 92 and lever 105. When plug 75 is thus pushed backwardly the other plugs are advanced to prevent the insertion of coins in any of the other openings. To hold the coin in place the user can slide it downwardly slightly past the bottom edge of the opening or can hold it in place by maintaining a light pressure with his finger.

Following the insertion of the coin the user depresses the cross head 93. This causes all of the fingers 92 to move downwardly in their grooves 65 and 91. The coin will be engaged by one of these fingers and forced downwardly within groove 66 and against lever 105. This lever will be pressed laterally out of the path of the coin and will swing its coupling lever 106 from the position normally occupied thereby to the position shown at the bottom of Figure 10. Consequently the following operations will take place:

*First.*—Finger 110 will pull through spring 111 so as to urge head 101 and plunger 99 forwardly. If the inserted article is not a coin but is a slug with a recessed face or a washer having the usual opening, the plunger will enter the recess or opening and thus lock the apparatus by preventing the inserted slug or the like from being forced further down into the machine.

If a coin of the proper value has been inserted the plunger will be held back thereby and downward movement of the coin in groove 66 will not be interfered with.

*Second.*—The lug 116 on the lever 106 will thrust against its link 115 and swing it so as to pull through spring 114 upon the arm of the counter so as to register one operation.

*Third.*—The depending pin 119 of the shifted lever 106 will thrust bar 117 longitudinally and cause its tripping finger 121 to move against the upper end of lever 122. Thus the lower end of said lever will have a limited free movement along the portion 124 of link 125, then pull the link so that its portion 126 will slide relative to lever 127 after which the lever 127 will be swung about its fulcrum 129. This delayed action of lever 127 results in its beveled end 130 moving along guide 120 and against the head 19 of lever 18. Said head will be depressed until lever 127 comes against stop 22 whereupon head 19 will move into position back of the end of the lever 127 and hold said lever in its set position as shown in Figure 4.

As the foregoing operation occurs pin 136 comes against one of the contacts 135 and forces it against the other contact as shown in Figure 4 while at the same time the end 133 of dog 131 is moved forwardly relative to its guide 134. When the contacts are brought together they close the circuit to the bell or other alarm 143 and also to the signal 144. Thus persons in the vicinity of the phone will know that it is in use and the operator at the central office will also be advised by the lamp 144.

By the time the foregoing action has taken place the latch 142 carried by the descending cross head has passed below the dog 131 so that the cross head cannot be returned by its springs 96 because of the interlocking of the parts 141 and 133 as illustrated in Figure 4.

While the foregoing operations are taking place the inserted coin has passed out of engagement with lever 105 so that all of the parts which had previously been shifted will be returned to their normal positions excepting the locked depressed cross head. As the coin travels downwardly it will sound the signal bell 23 as before explained and ultimately come against finger 19 of the tripping lever 12 so as to depress it and cause the dog 16 to lift lever 18 and release head 19 from engagement with the lower end of lever 127. Thus said lever will be free to swing against stop 21 while at the same time dog 131 will swing about its fulcrum and not only break the electrical connection at 135 but also withdraw its projecting end 133 from engagement with latch 141. As the cross head 92 is thus released it can rise to its normal position under the action of its springs 96, its movement being retarded to a desired extent by the dash-pots 95.

Obviously the signals 143 and 144 will be de-energized as soon as the circuit is broken and as the bell 23 has signalled the operator at the central station the desired call can be put through in the usual manner.

Should a slug or washer be inserted instead of a coin and the same become locked in the machine by plunger 99 it would not reach the lever 12 and consequently the apparatus would become locked and the signal devices 143 and 144 would operate continuously until the circuit thereto has been broken by an authorized person who must also pull the plunger back from the washer to release the washer into the machine. The sounding of the signal 143 would obviously discourage the use of slugs and the like because of the publicity thus given. The constant operation of the signal 44 serves notice to the central operator that the apparatus has been tampered with.

If discarding means is provided between the grooves 66 and lever 12 the same operation of the signals will take place.

If, through error, a dime, for example, should be placed in the nickel or the quarter opening and the apparatus operated, the movement of the dime downwardly in the groove 66 would not shift lever 105. Consequently the only result would be the discarding of the dime as it travels downwardly in the dime chute and its delivery into the channel 59 and trough 39.

When the coin is delivered past the tripping lever 12 it falls into hopper 25 where it is retained by the usual gate 26 until connection has been made with the other party. If such connection is made the gate is actuated electrically in the usual manner to deliver the coin into the coin box. If the connection is not made the central operator actuates the gate to return the coin to the customer. The coin to be returned is delivered into the compartment 30 by way of passage 29 and will fall onto the spring supported plate 43 as indicated at C. Thus the crank arm 47 will be lowered into the path of cam flange 52 and the customer, by actuating lever L, can impart a partial rotation to the cam as heretofore described, to lower the plates 33, 35 and 43 and deliver the coin C into trough 39 from which it can be removed readily.

When the coin was fed into the machine by the complete depression of the cross head it was counted as heretofore explained. When the coin is returned to the customer it is again counted at 54 as has been explained. Thus by deducting from the number of coins inserted in the nickel opening the number of coins withdrawn from the trough 39 it can be determined accurately the number of nickels which should be contained within the coin box.

On instructions received from the operator the customer can insert coins of other values into the respective openings after which the cross head can be operated in the same manner as heretofore explained except that, under ordinary conditions, none of these added coins are returned to the customer because they are not called for unless proper connection has been completed by the operator. Thus upon the completion of any time interval the counters will accurately indicate the number of dimes and quarters in the box, the number of nickels which were deposited in the apparatus, and the number of nickels which were returned to the customer.

Any under-sized coins and any slugs which may pass levers 105 without actuating them can be discarded by the usual or any selected means before reaching tripping lever 18 and when so discarded will be directed by a special chute 145 into the passage 59 as heretofore pointed out.

In Figures 19 and 20 there has been illustrated a slightly modified structure for use in placing coins properly within the apparatus. In this structure there are provided spring restrained plungers 146 slidably in a cover plate 147. This plate has coin receiving slots 148 which are inclined downwardly and open in front of the respective slidable plugs 149 in the coin grooves. When a coin or the like is dropped into one of the slots 148 it will be brought to a stop in an inclined position as shown at C' where it rests on a supporting shoulder 150. By pushing back on the plunger 146 the coin will be thrust off of the shoulder 150 and against plug 149 where it will be positioned for actuation by a finger of the cross head. If a washer should be inserted in lieu of a coin the plunger would pass through it and the apparatus could not operate.

It will be noted that when the cross head is depressed its fingers 92 prevent the insertion of coins into any of the coin receiving grooves and if the apparatus has become locked as a result of the insertion of a slug or the like, no other slugs or coins can be inserted.

What is claimed is:

1. In a telephone construction separate laterally spaced coin chutes, coin receiving openings in the respective chutes, movable baffle means in the respective chutes closing the openings at one end, means operated by the pressure of an inserted coin against one of the baffles, for holding the other baffles against movement, and depressible fingers, and means for moving the fingers into the respective chutes for shifting an inserted coin from engagement with its baffle means thereby to release all of the baffle means for actuation of any one of them by another inserted coin.

2. In a telephone construction separate coin chutes, movable baffle means in the respective chutes, means operated by the pressure of an inserted coin against one of the baffles for holding the other baffle against movement, means for shifting the inserted coin from engagement with its baffle means thereby to release all of the baffle means for actuation of any one of them by another inserted coin, means for automatically locking said coin shifting means against return movement, and means actuated by the inserted coin for releasing the locking means.

3. In a telephone apparatus a coin receiving groove, a lever supported therein out of the path of an inserted under-sized coin but in the path of a coin of predetermined size, means for forcing an inserted coin along the groove to actuate the lever, an alarm circuit including a switch, and means actuated by said lever for shifting the switch to close the circuit, said means including a coupling lever operatively engaged by the coin actuated lever, a slidable bar actuated by the coupling lever, and a lost motion, lever connection between the bar and the switch.

4. In a telephone apparatus a coin receiving groove, a lever supported therein out of the path of an inserted under-sized coin but in the path of a coin of predetermined size, means for forcing an inserted coin along the groove to actuate the lever, an alarm circuit including a switch, and means actuated by said lever for shifting the switch to close the circuit, said means including a coupling lever operatively engaged by the coin actuated lever, a slidable bar actuated by the coupling lever, and a lever connection between the bar and the switch, and means for automatically locking the switch when the circuit is closed.

5. In a telephone apparatus a coin receiving groove, depressible means for shifting the inserted coin along the groove, a lever, a latch and a switch carried by the lever, an alarm circuit in which the switch is located, a coin actuated element in the groove, means operated by said element when a coin is shifted by the depressible means for actuating the lever, thereby to close the switch and bring the latch to active position, means for automatically locking the lever in shifted position when the switch is closed and the latch in active position, and means carried by the depressible means for engagement by the latch to lock the depressible means against reverse movement.

6. In a telephone apparatus a coin receiving groove, a lever supported therein out of the path of an inserted under-sized coin but in the path of a coin of predetermined size, means for forcing an inserted coin along the groove to actuate the lever, an alarm circuit including a switch, and means actuated by said lever for shifting the switch to close the circuit, said means including a coupling lever operatively engaged by the coin actuated lever, a slidable bar actuated by the coupling lever, and a lever connection between the bar and the switch, means for automatically locking the switch when the circuit is closed, a channel for guiding an inserted coin upon leaving the groove and means operated by the coin within the channel for unlocking the switch to break the alarm circuit.

7. In a telephone apparatus a coin receiving groove, depressible means for shifting the inserted coin along the groove, a lever, a latch and a switch carried by the lever, an alarm circuit in which the switch is located, a coin actuated element in the groove, means operated by said element when a coin is shifted by the depressible means for actuating the lever, thereby to close the switch and bring the latch to active position, means for automatically locking the lever in shifted position when the switch is closed and the latch in active position, and means carried by the depressible means for engagement by the latch to lock the depressible means against reverse movement, and means operated by the inserted coin for shifting the locking means to release the switch and latch.

8. In a telephone apparatus a coin receiving channel, depressible means for directing an inserted coin into the channel for gravitation therealong, means operated by an inserted coin for locking the depressible means against return movement, and means operated by the coin within the channel for unlocking said depressible means.

9. In a telephone apparatus a coin receiving channel, depressible means for forcing a coin into the channel for gravitation therealong, an alarm circuit, a latch, a switch in the alarm circuit, means operated by an inserted coin for shifting the latch to active position and closing the switch, means carried by said depressible means for engagement with the shifted latch to hold said depressible means against return movement, and means for actuation by the coin within the channel for releasing the switch and latch for return to their normal positions.

10. In a telephone apparatus a coin receiving channel, a lever projecting into the channel for movement under pressure of a check within the channel, a plunger, yielding means actuated by the lever for forcing the plunger, when unobstructed, into the channel, yieldingly supported means for pressing the check along the channel and against and past the lever if not restrained by the plunger whereupon the check will gravitate down the coin channel, means for automatically locking said check pressing means in one extreme position, and means controlled by the gravitating check for unlocking the pressing means.

11. In a telephone apparatus a coin receiving groove, a movable element supported therein out of the path of an inserted under-sized coin but in the path of a coin of predetermined size, means for forcing an inserted coin along the groove to actuate said element, an alarm circuit including a switch, and means actuated by said element for shifting the switch to close the circuit, said means including a coupling member operatively engaged by the coin actuated element, a slidable device actuated by the coupling member, and a lost motion connection between said device and the switch.

WILLIAM T. ANDERSON.